US009780888B2

(12) United States Patent
Khoshnevisan et al.

(10) Patent No.: US 9,780,888 B2
(45) Date of Patent: Oct. 3, 2017

(54) TECHNIQUES FOR MITIGATING CROSS DEVICE CO-EXISTENCE INTERFERENCE

(71) Applicant: QUALCOMM Incorporated, San Diego, CA (US)

(72) Inventors: Mostafa Khoshnevisan, San Diego, CA (US); Chirag Sureshbhai Patel, San Diego, CA (US); Mehmet Yavuz, San Diego, CA (US); Ahmed Kamel Sadek, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/077,316

(22) Filed: Mar. 22, 2016

(65) Prior Publication Data

US 2016/0337047 A1    Nov. 17, 2016

Related U.S. Application Data

(60) Provisional application No. 62/160,462, filed on May 12, 2015.

(51) Int. Cl.
*H04B 15/00* (2006.01)
*H04L 1/00* (2006.01)
(Continued)

(52) U.S. Cl.
CPC ........... *H04B 15/00* (2013.01); *H04B 10/118* (2013.01); *H04B 17/318* (2015.01); *H04K 3/90* (2013.01);
(Continued)

(58) Field of Classification Search
CPC ............................. H04B 15/00; H04B 10/118
See application file for complete search history.

(56) References Cited

U.S. PATENT DOCUMENTS 8,520,586 B1 *   8/2013   Husted ................. H04W 74/08
                                                     370/318
8,639,285 B2     1/2014   Aguirre et al.
(Continued)

FOREIGN PATENT DOCUMENTS

WO   WO-2014/195161 A1   12/2014
WO   WO-2015/057156 A2   4/2015

OTHER PUBLICATIONS

"3rd Generation Partnership Project; Technical Specification Group Radio Access Network; Evolved Universal Terrestrial Radio Access (E-UTRA); Study on signaling and procedure for interference avoidance for in-device coexistence (Release 11)", 3GPP DRAFT; 36816-B20, 3rd Generation Partnership Project (3GPP), Mobile Competence Centre ; 650, Route Des Lucioles ; F-06921 Sophia-Antipolis Cedex ; France Dec. 22, 2011 (Dec. 22, 2011), XP050916148, Retrieved from the Internet: URL:http://www.3gpp.org/ftp/Specs/zltuInfo/M.2012-2/2014-12/Re1-11/36_series/ [retrieved on Dec. 22, 2011].
(Continued)

*Primary Examiner* — Christopher M Brandt
(74) *Attorney, Agent, or Firm* — Arent Fox LLP

(57) ABSTRACT

The disclosure provides techniques for reducing interference caused by a first device to a second device receiving a satellite-based positioning signal. A device such as a user equipment (UE) or base station (eNB) determines a threshold transmission power for a transmission frequency of the device. The device also determines a signal strength of the satellite-based positioning system signal at the device. The device then controls a transmission property of the device based on the signal strength of the satellite-based positioning system signal when a transmission power of the device at the transmission frequency satisfies the threshold. The device may also determine that reception of the satellite-based positioning system signal by the second device is likely to be affected by a transmission from the device at a transmission power that satisfies the threshold and control the transmis-
(Continued)

sion property when reception of the satellite-based positioning system signal is likely to be affected.

28 Claims, 11 Drawing Sheets

(51) Int. Cl.
*H04W 52/16* (2009.01)
*H04W 52/24* (2009.01)
*H04B 17/318* (2015.01)
*H04B 10/118* (2013.01)
*H04W 16/32* (2009.01)
*H04W 40/08* (2009.01)
*H04K 3/00* (2006.01)
*G01S 19/21* (2010.01)
*H04W 52/34* (2009.01)
*H04W 88/02* (2009.01)
*H04W 88/08* (2009.01)

(52) U.S. Cl.
CPC .......... *H04L 1/0001* (2013.01); *H04W 16/32* (2013.01); *H04W 40/08* (2013.01); *H04W 52/16* (2013.01); *H04W 52/243* (2013.01); *G01S 19/21* (2013.01); *H04W 52/34* (2013.01); *H04W 88/02* (2013.01); *H04W 88/08* (2013.01)

(56) References Cited

U.S. PATENT DOCUMENTS

| | | | |
|---|---|---|---|
| 8,730,828 B2 | 5/2014 | Doppler et al. | |
| 9,107,172 B1* | 8/2015 | Epstein | H04B 1/1027 |
| 2010/0313241 A1* | 12/2010 | Lee | G06F 15/16 |
| | | | 726/3 |
| 2011/0205106 A1* | 8/2011 | Bria | G01S 19/11 |
| | | | 342/352 |
| 2012/0071106 A1* | 3/2012 | Kadous | H04W 52/38 |
| | | | 455/67.11 |
| 2014/0274162 A1 | 9/2014 | Chao et al. | |
| 2015/0105029 A1 | 4/2015 | Russell et al. | |

OTHER PUBLICATIONS

Ericsson et al., "GPS Based Maximum Power Adjustment in HeNB," 3GPP Draft; R4-100564, 3rd Generation Partnership Project (3GPP), Mobile Competence Centre ; 650, Route Des Lucioles ; F-06921 Sophia-Antipolis Cedex ; France, vol. RAN WG4, No. San Francisco, USA; Feb. 22, 2010, Feb. 16, 2010 (Feb. 16, 2010), XP050426022, [retrieved on Feb. 16, 2010].

International Search Report and Written Opinion—PCT/US2016/030215—ISA/EPO—Jul. 21, 2016 (15 total pages).

\* cited by examiner

TECHNIQUES FOR MITIGATING CROSS DEVICE CO-EXISTENCE INTERFERENCE

RELATED APPLICATIONS

This application claims priority from U.S. Provisional Application No. 62/160,462 entitled "TECHNIQUES FOR MITIGATING CROSS DEVICE CO-EXISTENCE INTERFERENCE," filed on May 12, 2015, which is incorporated herein by reference in its entirety.

INTRODUCTION

The present disclosure relates generally to communication systems, and more particularly, to techniques for mitigating cross device co-existence interference.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmission power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

For example, LTE or other cellular technologies may be expanded to use portions of unlicensed spectrum. In some cases, interference caused by an LTE transmission from a first device may saturate a satellite-based positioning system receiver at a second device in a nearby channel. For example, a blocker signal (e.g., a signal outside of a global navigation satellite system (GNSS) frequency band) may be a strong jammer that saturates the satellite-based positioning system receiver and interferes with the second device's ability to detect the satellite-based positioning system signal. The interference may prevent the satellite-based positioning system receiver from accurately determining a location. Accordingly, mitigation of cross device interference to satellite navigation system receivers may be desirable.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the disclosure provides a method of reducing interference caused by a first device. The method may include determining a threshold transmission power for a transmission frequency of the first device. The method may further include determining a signal strength of a satellite-based positioning system signal at the first device. The method may additionally include controlling a transmission property of the device based on the signal strength of the satellite-based positioning system signal when a transmission power of the first device at the transmission frequency satisfies the threshold transmission power. The method may also include determining that reception of the satellite-based positioning system signal by a second device is likely to be affected by a transmission from the first device at a transmission power that exceeds the threshold transmission power, wherein controlling the transmission property is further based on the determination that reception of the satellite-based positioning system signal by a second device is likely to be affected by the transmission from the first device.

In another aspect, the disclosure provides an apparatus for reducing interference caused by a first device. The apparatus may include a transceiver, a memory configured to store instructions, and a processor communicatively coupled to the transceiver and the memory, where the processor is configured to execute the instructions. In one aspect, the processor may be configured to determine a threshold transmission power for a transmission frequency of the first device. The processor may also be configured to determine a signal strength of a satellite-based positioning system signal at the first device. The processor may additionally be configured to control a transmission power of the first device based on the signal strength of the satellite-based positioning system signal when the transmission power exceeds the threshold transmission power. The processor may also be configured to determine that reception of the satellite-based positioning system signal by a second device is likely to be affected by a transmission from the first device at a transmission power that exceeds the threshold transmission power, wherein the processor is configured to control the transmission property of the first device when reception of the satellite based positioning system signal by the second device is likely to be affected.

In another aspect, the disclosure provides another apparatus for reducing interference caused by a first device. The apparatus may include means for determining a threshold transmission power for a transmission frequency of the first device. The apparatus may further include means for determining a signal strength of a satellite-based positioning system signal at the first device. The apparatus may additionally include means for controlling a transmission property of the first device based on the signal strength of the satellite-based positioning system signal when a transmission power of the first device at the transmission frequency satisfies the threshold transmission power. The apparatus may also include means for determining that reception of the satellite-based positioning system signal by a second device is likely to be affected by a transmission from the first device at a transmission power that satisfies the threshold transmission power, wherein the means for controlling the transmission property is further for controlling the transmission power when reception of the satellite based positioning system signal by the second device is likely to be affected.

In another aspect, the disclosure provides a computer-readable medium storing computer executable code for reducing interference caused by a first device. The computer-readable medium may include code for determining a threshold transmission power for a transmission frequency of the first device. The computer-readable medium may further include code for determining a signal strength of a satellite-based positioning system signal at the first device. The computer-readable medium may also include code for code for controlling a transmission property of the first device based on the signal strength of the satellite-based positioning system signal when the transmission power of the first device at the transmission frequency satisfies the threshold transmission power. The computer-readable medium may additionally include code for determining that reception of the satellite-based positioning system signal by a second device is likely to be affected by a transmission from the first device at a transmission power that satisfies the threshold transmission power, wherein controlling the transmission property is further based on the determination that reception of the satellite-based positioning system signal by a second device is likely to be affected by the transmission from the device. In an aspect, the computer-readable medium may be a non-transitory computer-readable medium.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
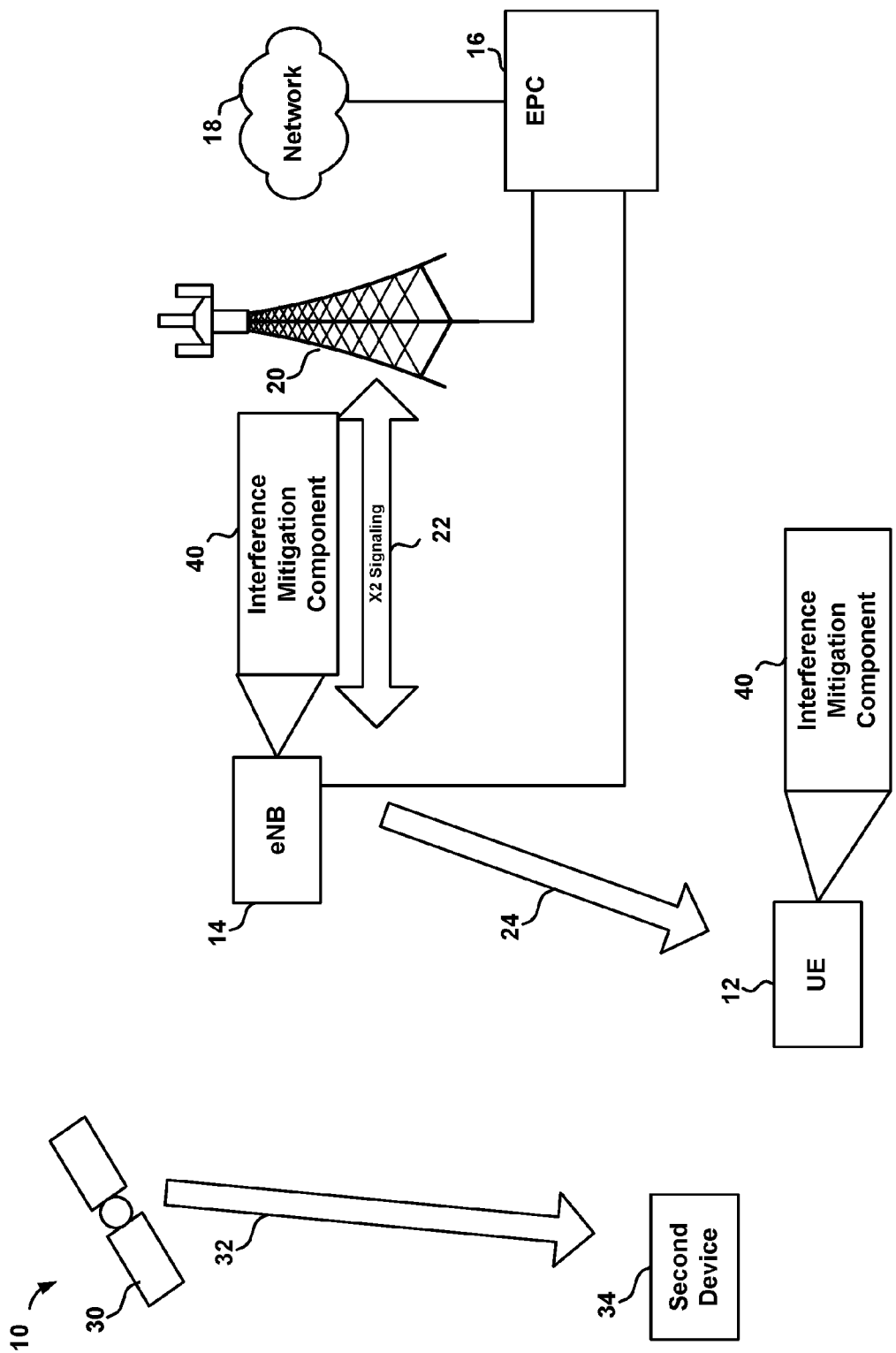
FIG. 1 is a diagram illustrating an example of a communications system including an evolved node B in communication with a user equipment, each having an interference mitigation component.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In an aspect, the present disclosure provides for mitigating interference caused by transmissions from one device to reception of a satellite-based positioning system signal by another device. The satellite-based positioning system signal may be relatively weak compared to signals transmitted by a UE or a base station. A strong LTE signal may interfere with a satellite-based positioning system signal in a nearby frequency band, especially when the LTE device is in relatively close physical proximity (e.g., less than 10 meters). Co-existence interference may refer to interference caused by LTE or other wireless signals on a nearby satellite-based positioning system (e.g., GNSS) device. In an aspect, an LTE device may mitigate co-existence interference by controlling the transmission properties of the LTE device.

When a satellite-based positioning system receiver is indoors, however, the satellite-based positioning system signals may be too weak for any receiving device to use. Further, a satellite-based positioning system may require a line of sight (LOS) in order to determine a position using timing differences, which may become distorted when a receiver is indoors. Accordingly, a device may not rely on a satellite-based positioning system when indoors. Therefore, an LTE device may not need to mitigate co-existence interference to a satellite-based positioning system signal when the LTE device is indoors and would only affect indoor devices.

In an aspect, an LTE device may determine that a transmission from the device at a transmission power that satisfies a threshold transmission power may affect the reception of a satellite-based positioning system signal by a second device. The threshold transmission power may be based on a spacing or separation between a transmission frequency of the LTE device and a frequency band used by the satellite-based positioning system signal. When a transmission power for the LTE device satisfies the threshold transmission power, the LTE device may determine whether the transmission will affect a second device. To be affected by an LTE transmission may indicate that a second device would experience interference in a satellite-based positioning system frequency band from the LTE transmission if within a minimum distance from the LTE device and if attempting to receive the satellite-based positioning system signal.

In an aspect, the LTE device may be uncertain whether a second device is present within the minimum distance or attempting to receive the satellite-based positioning system signal. Accordingly, the LTE device may determine a probability or likelihood that reception of the satellite-based positioning system signal by a second device is likely to be affected by a transmission from the device at a transmission power that satisfies the threshold transmission power. In an aspect, interference to reception of the satellite-based positioning system signal may be considered likely when at least one condition indicating likely interference is satisfied. For example, a UE may determine that a second device is likely to be affected when the user equipment is moving at a high speed. In an aspect, the UE may determine that the UE is moving at a high speed based on a number of cell changes within a time period. For example, a transmission from the UE in a motor vehicle may affect a second device located in the vehicle or in a vehicle traveling in a nearby lane. As another example, an eNodeB may determine that a second device is likely to be affected when the eNodeB's coverage area includes an outdoor area. An outdoor area may be an area with a line of sight to a satellite. The eNodeB may determine that the eNodeB's coverage area includes an outdoor area based on the strength of a satellite-based positioning system signal received at the eNodeB or the strength of a macro base station signal received at the eNodeB. For example, a small cell eNodeB located outdoors or near a window may receive a relatively strong satellite-based positioning system signal. In another aspect, a probability that a second device will be affected may be estimated. Interference to reception of the satellite-based positioning system signal may be considered likely when the probability satisfies a threshold value (e.g., 10%, 20%, 30%, or 50%).

The LTE device may mitigate interference to the satellite-based positioning system signal by controlling the transmission properties of the device based on the signal strength of the satellite-based positioning system. For example, a UE may limit its maximum transmission power to prevent transmissions that are likely to interfere with satellite-based positioning signals at nearby devices. In another aspect, a control entity may control the transmission power of the device based on the signal strength of the satellite-based positioning system. For example, the UE may report the GPS signal strength to a serving cell, which may then control the transmit power of the UE. If the maximum transmission power is too low for the UE, the UE may restrict services or change to a new cell. As another example, a small cell may use transmission power management (TPM) techniques for self-organizing networks (SON) to reduce its transmission power. Other small cells may increase transmission power to compensate for a reduced coverage area of the small cell. In another aspect, an LTE device may adjust a bandwidth used for the transmission. For example, an eNB may limit the bandwidth selected for transmission in the unlicensed spectrum. Limiting the bandwidth may increase a separation between a transmission frequency of the device and a frequency band used for the satellite-based positioning system. As another example, an eNB may change a center frequency used for transmissions. The eNB may change the transmission frequency of the device (e.g., a center frequency) to a second transmission frequency with a greater separation from a frequency band used by the satellite-based positioning system signal than a separation between the transmission frequency of the device and the frequency band used by the satellite-based positioning system signal. Further, the LTE device may use any combination of transmission power, bandwidth, and center frequency to mitigate interference to the satellite-based positioning system signal.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary implementations, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

Referring to FIG. 1, in an aspect, a wireless communication system 10 includes an evolved nodeB (eNB) 14 in communication with user equipment (UE) 12. The terms "eNB" and "cell" may be used interchangeably herein and may refer either an eNB or the cell provided by the eNB depending on the context. The wireless communication system 10 may also include a second eNB 20. A satellite 30 may transmit a satellite-based positioning signal 32 to a second device 34, which may be a second UE or another device including a satellite-based positioning system signal receiver.

In an aspect, the satellite 30 may be, for example, part of a global navigation satellite system (GNSS) or a regional satellite system. For example, the satellite 30 may be part of the global positioning system (GPS), the global navigation satellite system (GLONASS), the BeiDou/Compass navigation system, or the Galileo positioning system. The satellite-based positioning signal 32 may be broadcast by the satellite 30 and received by any receiving device. The satellite-based positioning signal 32 may include timing information. The second device 34 may use multiple satellite-based positioning signals 32 from different satellites 30 to determine coordinates of the second device 34. In an aspect, the satellite-based positioning signals may operate in a dedicated frequency band. For example, a frequency band of 1550 MHz-1610 MHz may be used for GPS signals. Other frequency bands may be used for different satellite-based positioning signals or systems.

The eNB 14 and/or the UE 12 may include an interference mitigation component 40 for reducing interference at the second device 34 caused by transmissions. For example, the interference mitigation component 40 at the eNB 14 may reduce interference to satellite-based positioning system signals by controlling the transmission properties of the eNB 14. As another example, the interference mitigation component 40 at the UE 12 may reduce interference to satellite-based positioning system signals by controlling the transmission properties of the UE 12. In an aspect, the transmission properties may include transmission power, center frequency, bandwidth, or any combination thereof.

A UE 12 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 12 may be a cellular phone, a personal digital assistant (PDA), a wireless modem, a wireless communication device, a handheld device, a tablet computer, a laptop computer, a cordless phone, a wireless local loop (WLL) station, a global positioning system (GPS) device, a multimedia device, a video device, a digital audio player (e.g., MP3 player), a camera, a game console, a wearable computing device (e.g., a smart-watch, smart-glasses, a health or fitness tracker, etc.), an appliance, a sensor, a vehicle communication system, a medical device, a vending machine, a device for the Internet-of-Things, or any other similar functioning device. A UE 12 may be able to communicate with macro eNBs, pico eNBs, femto eNBs, relays, and the like.

An eNB 14 may provide a cell serving the UE 12. In some aspects, multiple UEs such as UE 12 may be in communication coverage with one or more eNBs, including eNB 14 and eNB 20. An eNB 14 may be a station that communicates with the UE 12 and may also be referred to as a base station, an access point, a NodeB, etc. Each eNB, such as eNB 14 may provide communication coverage for a particular geographic area. In 3GPP, the term "cell" can refer to a coverage area of an eNB 14 and/or an eNB subsystem serving the coverage area, depending on the context in which the term is used. For example, the eNB 14 may be the cell where the UE 12 initially performs a connection establishment procedure. Such a cell may be referred to as a primary cell or Pcell. Another eNB (e.g., eNB 20) may be operating on another frequency and may be referred to as a secondary cell. It should be apparent that an eNB may operate as either a primary cell or a secondary cell depending on the connection state of the UE 12. A cell ID such as a primary cell identifier (PCI) may be mapped to an eNB. A UE may be within the coverage areas of multiple eNBs. One of these eNBs may be selected to serve the UE. The serving eNB may be selected based on various criteria including radio resource monitoring measurements and radio link monitoring measurements such as received power, path loss, signal-to-noise ratio (SNR), etc.

An eNB 14 may provide communication coverage for a macro cell, a small cell, a pico cell, a femto cell, and/or other types of cell. A macro cell may cover a relatively large geographic area (e.g., several kilometers in radius) and may allow unrestricted access by UEs 12 with service subscription. The term "small cell," as used herein, refers to a relatively low transmission power and/or a relatively small coverage area cell as compared to a transmission power and/or a coverage area of a macro cell. Further, the term "small cell" may include, but is not limited to, cells such as a femto cell, a pico cell, access point base stations, Home NodeBs, femto access points, or femto cells. For instance, a macro cell may cover a relatively large geographic area, such as, but not limited to, several kilometers in radius. In contrast, a pico cell may cover a relatively small geographic area and may allow unrestricted access by UEs 12 with service subscription. A femto cell may cover a relatively small geographic area (e.g., a home) and may allow restricted access by a UE 12 having association with the femto cell (e.g., UE 12 may be subscribed to a Closed Subscriber Group (CSG), for users in the home, etc.). An eNB 14 for a macro cell may be referred to as a macro eNB. An eNB 14 for a pico cell may be referred to as a pico eNB. An eNB 14 for a femto cell may be referred to as a femto eNB or a home eNB. An eNB 14 may communicate with a second eNB 20 via X2 signaling 22.

Figure 2:
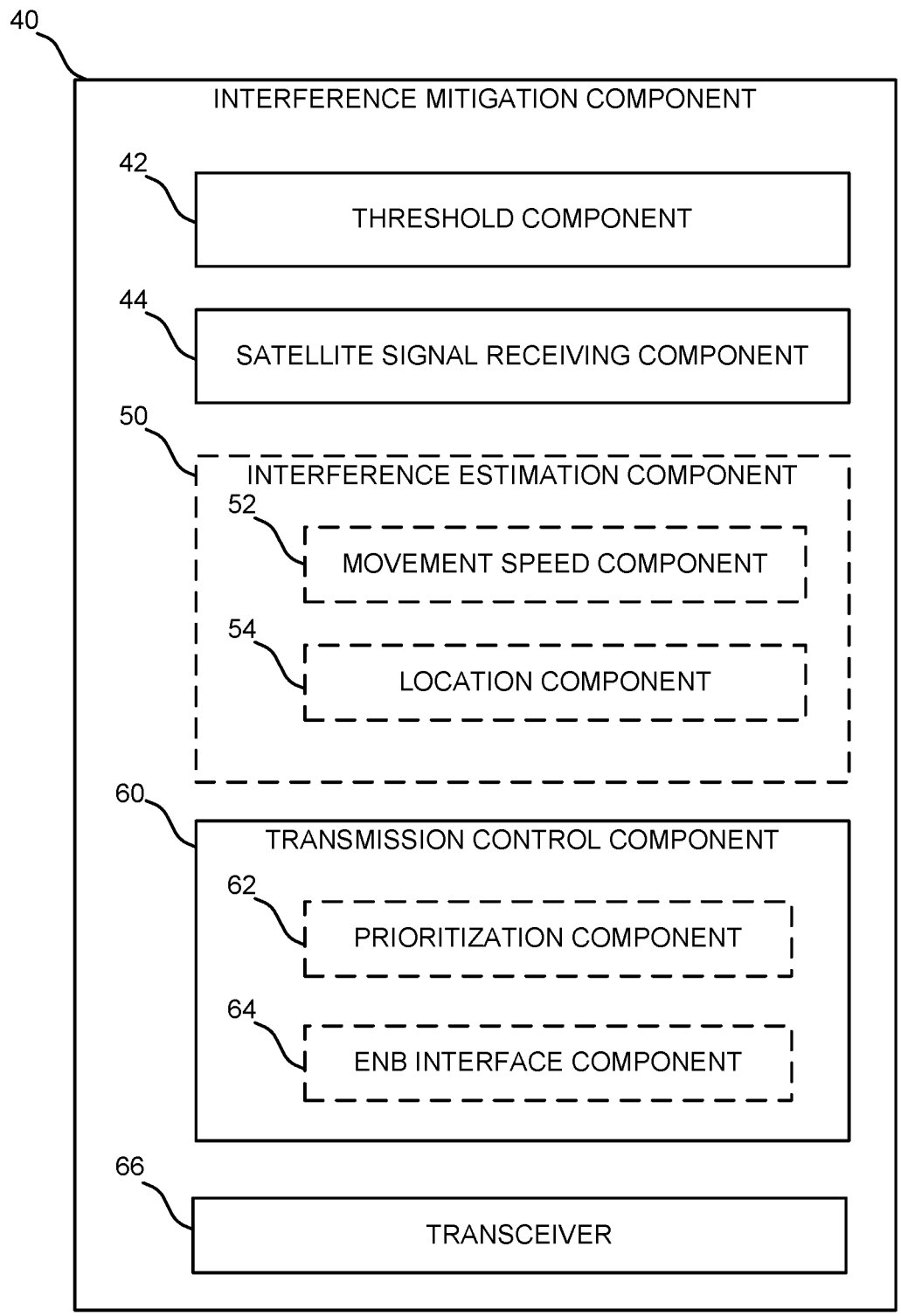
FIG. 2 is a diagram illustrating an example of an interference mitigation component.

Referring to FIG. 2, the interference mitigation component 40, which may be located in a UE 12 or eNB 14, may include hardware and/or software code executable by a processor for mitigating interference to satellite-based positioning signals at a nearby second device 34. In an aspect, the term "component" as used herein may be one of the parts that make up a system, may be hardware, firmware, and/or software, and may be divided into other components. As illustrated in FIG. 2, the interference mitigation component 40 may include a threshold component 42 that determines threshold transmission power for a transmission frequency used by the UE 12 and/or eNB 14, a satellite signal receiving component 44 for receiving a satellite-based positioning signal and determining the strength of the received signal (e.g., received signal strength indicator (RSSI)), an interference estimation component 50 that determines whether a transmission satisfying the threshold transmission power is likely to affect a second device; and a transmission control component 60 for controlling a transmission property of the UE 12 and/or eNB 14. In an aspect, it should be understood that transmission property control may be performed by both UE 12 and eNB 14. For example, network-assisted power control may involve a UE 12 sending measurements or other information to the eNB 14 and receiving thresholds, commands, or limits from the eNB 14.

Figure 8:
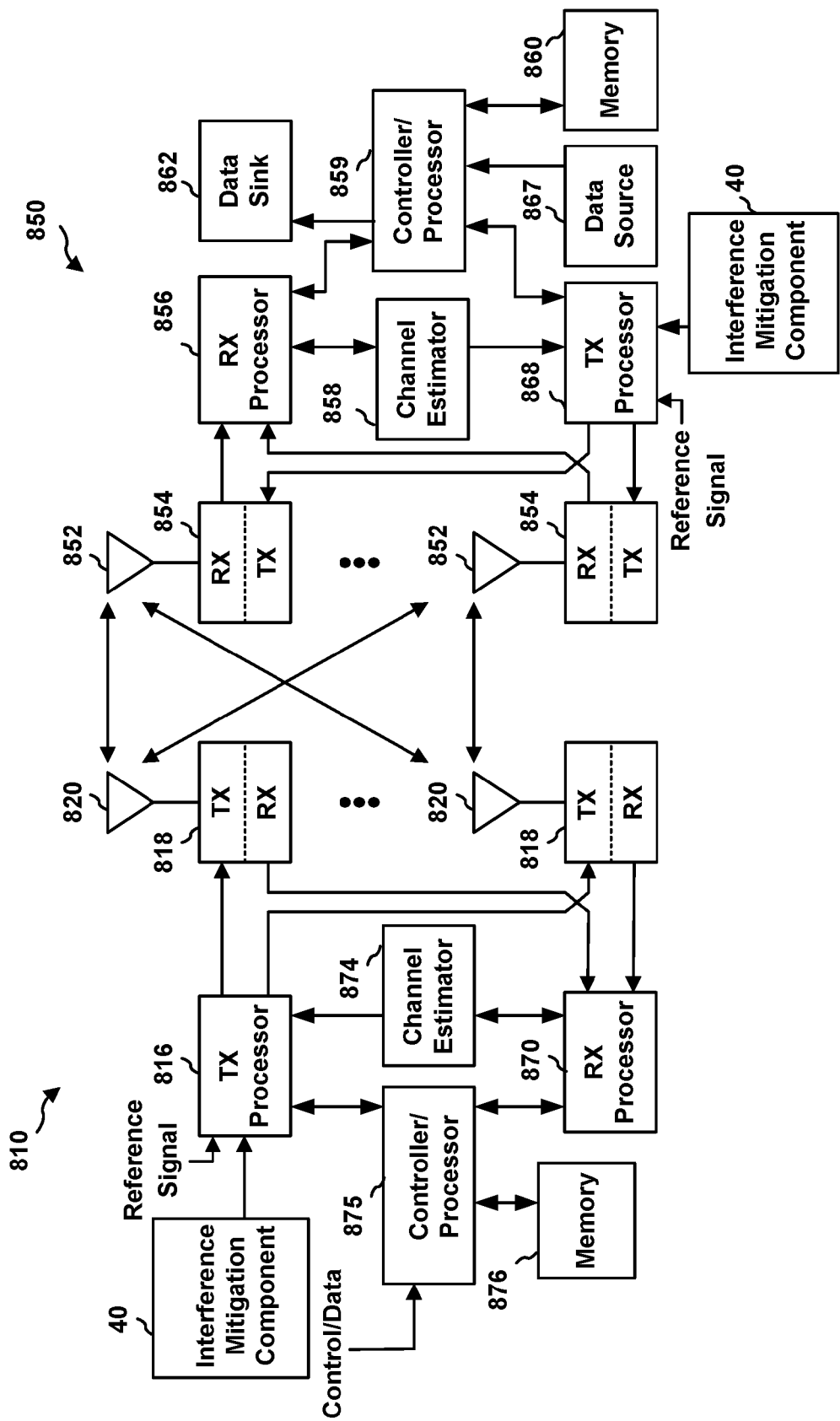
FIG. 8 is a diagram illustrating an example of an evolved Node B and user equipment in an access network.

The threshold component 42 may include hardware and/or software code executable by a processor for determining a threshold transmission power for a transmission frequency of the UE 12 or eNB 14. For example, the threshold component 42 may be implemented by controller/processor 875 (FIG. 8) or the controller/processor 859 (FIG. 8). The transmission frequency of the UE 12 may be an uplink frequency. The transmission frequency of the eNB 14 may be a downlink frequency. In a TDD system, a transmission frequency may be used by both the UE 12 and the eNB 14 for uplink and downlink transmissions. In an aspect, the threshold component 42 may determine the threshold transmission power based on a separation between the transmission frequency of the UE 12 or eNB 14 and the frequency band used by the satellite-based positioning system signal. As used herein, the term "separation" refers to a separation in the frequency domain where frequencies (e.g., center frequencies) are apart from each other by a certain amount. Generally, interference to a satellite-based positioning system signal may be inversely proportional to the separation between the frequencies. The interference may also be inversely proportional to the physical distance separating the transmitting device (e.g., UE 12 or eNB 14) and the satellite-based positioning system receiver in the second device 34. Accordingly, a threshold transmission power may be based on a minimum required distance (e.g., a spatial distance) between the UE 12 or eNB 14 and the second device 34. For example, transmissions with a transmission power less than the threshold transmission power may not cause significant interference to a satellite-based positioning receiver located more than the minimum required distance from the UE 12 or eNB 14.

A transmission with a transmission power that exceeds the threshold transmission power may cause interference to any satellite-based positioning receiver located within the minimum required distance. In an aspect, the threshold transmission power for a transmission frequency may be predetermined and stored in a memory or look-up table. In another aspect, the threshold transmission power for a transmission frequency may be signaled by the network.

The satellite signal receiving component 44 may include hardware and/or software code executable by a processor for determining a signal strength (e.g., RSSI) of a satellite-based positioning system signal. In an aspect, for example, the satellite signal receiving component 44 may be a satellite-based positioning system receiver such as a GPS receiver. In another aspect, the satellite signal receiving component 44 may be integrated with another radio-frequency (RF) receiver in the UE 12 or eNB 14. For example, the satellite signal receiving component 44 may include receive chain components such as filters, amplifiers, etc. configured to separate and process a satellite-based positioning system signal. In another aspect, the satellite signal receiving component 44 may be implemented, at least in part, by the RX processor 870 (FIG. 8) or the RX processor 856 (FIG. 8). The satellite signal receiving component 44 may also decode the satellite-based positioning system signal and provide location information. In an aspect, the satellite signal receiving component 44 may receive a signal strength reported by another device (e.g., UE 12).

The interference estimation component 50 may include hardware and/or software code executable by a processor for determining whether reception of the satellite-based positioning system signal by a second device is likely to be affected by a transmission at a transmission power that satisfies the threshold transmission power. For example, the interference estimation component 50 may be implemented by controller/processor 875 or the controller/processor 859. In an aspect, the interference estimation component 50 may determine that any satellite-based positioning system signal receiver within a minimum required distance from the UE 12 or eNB 14 is likely to be affected by the transmission at the transmission power that satisfies the threshold transmission power. In an aspect, for example, a transmission power may satisfy the threshold transmission power when the transmission power has a value that is greater than or equal to a value of the threshold transmission power. In another aspect, for example, satisfying the threshold may involve having a value that is less than or equal to the threshold. The interference estimation component 50 may also determine whether a satellite-based positioning system signal receiver within the minimum required distance from the UE 12 or eNB 14 is likely to be affected by the transmission at the transmission power that satisfies the threshold transmission power based on whether a second device receiving a satellite-based positioning system signal is likely to be within the minimum required distance and attempting to receive the satellite-based positioning system signal. For example, the interference estimation component 50 may determine a likelihood or probability that a second device is within the minimum required distance based on a movement speed or indoor/outdoor location. The interference estimation component 50 may optionally include a movement speed component 52 or a location component 54 for determining whether a second device receiving a satellite-based positioning system signal is likely to be within the minimum required distance.

The movement speed component 52 may include hardware and/or software code executable by a processor for determining whether a UE 12 is a fast moving UE. For example, the movement speed component 52 may be implemented by controller/processor 875 or the controller/processor 859 in FIG. 8. A fast moving UE may be a UE that has a movement speed exceeding a threshold movement speed (e.g., 10 miles per hour (MPH). In an aspect, for example, the movement speed component 52 may determine whether a UE 12 is a fast moving UE based on a number of cell changes within a time period. In an aspect, each cell change may be weighted based on the size of the cell. If the UE 12 experiences a large number of cell changes (e.g., handovers or reselections) within a short time, the UE may be moving quickly. For example, the UE may be in a motor vehicle. Accordingly, it may be likely that a second device (e.g., second device 34 in FIG. 1) receiving a satellite-based positioning system signal is also in the motor vehicle, or is in a nearby motor vehicle. Therefore, the interference estimation component 50 may determine that reception of the satellite-based positioning system signal by a second device is to be affected by a transmission at a transmission power that exceeds the threshold transmission power when the UE 12 is a fast-moving UE. In another aspect, movement speed component 52 may determine the movement speed of the UE using different techniques. For example, the movement speed component 52 may determine the movement speed of the UE based on changes in GPS coordinates, or using an accelerometer.

The location component 54 may include hardware and/or software code executable by a processor for determining whether a UE 12, eNB 14, or coverage area thereof is at least partially outdoors. In an aspect, a UE 12 or eNB 14 that is indoors is unlikely to affect a second device receiving a satellite-based positioning system signal because such signals require a line of sight, which is unavailable indoors. Therefore a UE 12 or eNB 14 that is indoors is less likely to affect reception of the satellite-based positioning system signal by a second device. The location component 54 may determine whether the UE 12 or eNB 14 is indoors based on a signal strength of the satellite-based positioning system signal. For example, if the signal strength of the satellite-based positioning system signal exceeds a threshold, the location component 54 may determine that the UE 12 or eNB 14 is outdoors because the satellite-based positioning system signal is sufficiently strong that it is unlikely that the UE or eNB 14 is indoors where the satellite-based positioning system signal is typically highly attenuated. In the case of an eNB 14, a signal strength exceeding a threshold may indicate that the coverage area of the eNB 14 includes an outdoor area. In another aspect, a signal strength of a macro base station may be indicative of whether the UE 12 or eNB 14 is outdoors. Further, the location component 54 may use a combination of the satellite-based positioning signal strength and the signal strength of a macro base station to determine whether the UE 12 or eNB 14 is outdoors. For example, the signal strengths may be combined using weighting.

The transmission control component 60 may include hardware and/or software code executable by a processor for controlling a transmission property of a UE 12 or eNB 14 based on the signal strength of the satellite-based positioning system signal when reception of the satellite-based positioning system signal by the second device is likely to be affected. For example, the transmission control component 60 may control a transmission power, a transmission bandwidth, a transmission center frequency, or any combination thereof. In an aspect, the transmission control component 60 may be implemented by the transmission processor 816 or the transmission processor 868 in FIG. 8.

As an example of controlling a transmission property, the transmission control component 60 may set a maximum transmission power for the UE 12 or eNB 14 based on the signal strength of the satellite-based positioning system signal. A UE 12 may set its own maximum transmission power, or may report the signal strength of the satellite-based positioning system signal to a serving cell, which may set the maximum transmission power and control the transmission power of the UE 12 based on the maximum transmission power. Generally, if the satellite-based positioning system signal is strong, the second device may be able to tolerate a greater level of interference and still be able to decode the satellite-based positioning system signal to obtain location or positioning information. Accordingly, when the satellite-based positioning system signal is weak, the maximum transmission power may be set relatively low; and the maximum transmission power may be set higher when the satellite-based positioning system signal is relatively strong. As discussed above, the transmission control component 60 may implement the maximum transmission power only when the interference estimation component indicates that the transmission is likely to affect reception of the satellite-based positioning system signal by a second device. For example, when the UE 12 or eNB is indoors and the satellite-based positioning system signal is weak, the transmission control component 60 may impose no maximum transmission power.

In an aspect, a transmission control component 60, at a UE 12 or eNB 14 may also determine whether a maximum transmission power is insufficient to maintain current data service requirements or insufficient to maintain an association with a current cell. For example, the transmission power may be insufficient to maintain current data service requirements when the maximum transmission power would result in a data rate less than a data rate of the current data service. As another example, the maximum transmission power may be insufficient to maintain an association with the current cell when the maximum transmission power prevents the UE 12 from further increasing the transmission power in response to a transmission power control command. The transmission control component 60 may also determine that the maximum transmission power is insufficient for any combination of current data service requirements and maintaining an association. In response to determining that the maximum transmission power is insufficient, the transmission control component 60 may cause the UE 12 to change to a different cell that uses a different transmission frequency with a greater separation from a frequency band used by the satellite-based positioning system signal than a separation between the transmission frequency of the device and the frequency band used by the satellite-based positioning system signal. For example, the transmission control component 60 may cause the UE 12 to change from a small cell operating in unlicensed spectrum with a first separation between an operating frequency and the frequency band used by the satellite-based positioning system signal to a macro base station using a licensed frequency band with a second separation between the licensed frequency band and the frequency band used by the satellite-based positioning system signal.

In an aspect, a transmission control component 60 at an eNB 14 may use transmission power management (TPM) to control the transmission power. The eNB 14 may report a TPM decision to one or more other eNBs or a coordinating entity using an eNB interface component 64. The eNB 14 may also receive TPM information from another eNB via the eNB interface component 64. In an aspect, the eNB interface component 64 may be a network interface and may implement an X2 interface using X2 signaling 22 (FIG. 1) or an S1 interface using signaling via the EPC 16 (FIG. 1). The other eNBs may adjust their transmission power to compensate for a reduced coverage area of the eNB 14. As another example, the transmission control component 60 at an eNB 14 may change the transmission frequency of the eNB 14. The transmission control component 60 may initiate a reconfiguration of the eNB 14 to use a different center frequency as a new transmission frequency. The transmission control component 60 may signal any connected UEs to change to the new transmission frequency for communication with the eNB 14. The eNB interface component 64 may also communicate information regarding the change in transmission frequency to other eNBs.

In an aspect, a transmission control component 60 at a UE 12 may optionally include a prioritization component 62. The prioritization component 62 may include hardware and/or software code executable by a processor for determining at least one critical service of the device and restricting data for the transmission to data for the at least one critical service. For example, the prioritization component 62 may identify a critical service such as a voice over LTE (VoLTE) service. A service may be a data stream associated with a particular use and be associated with a priority level. In an aspect, a critical service may be a service having a threshold priority level. For example, the threshold priority level may be the highest priority level. In an aspect, only the highest priority service may be a critical service. The prioritization component 62 may restrict data for transmission to one or more critical services. As another example, the prioritization component 62 may determine to only transmit data from a priority transmission queue. In an aspect, by restricting the data for transmission, the prioritization component may facilitate use of a lower transmission power. For example, the modulation or coding scheme may be reduced along with the transmission power.

The transceiver 66 may include an RF transmitter for transmitting a scheduled transmission. In an aspect, the transceiver 66 may include one or more transmit chain components and/or antennas. Further, the transceiver 66 may include one or more amplifiers. The transmission power may be adjusted by adjusting the gain applied to the one or more amplifiers. In an aspect, the transceiver 66 may transmit with a transmission power determined by the transmission control component 60. Further, the transceiver 66 may include an RF receiver for receiving the satellite-based positioning system signals in addition to or in place of the satellite signal receiving component 44.

Figure 3:
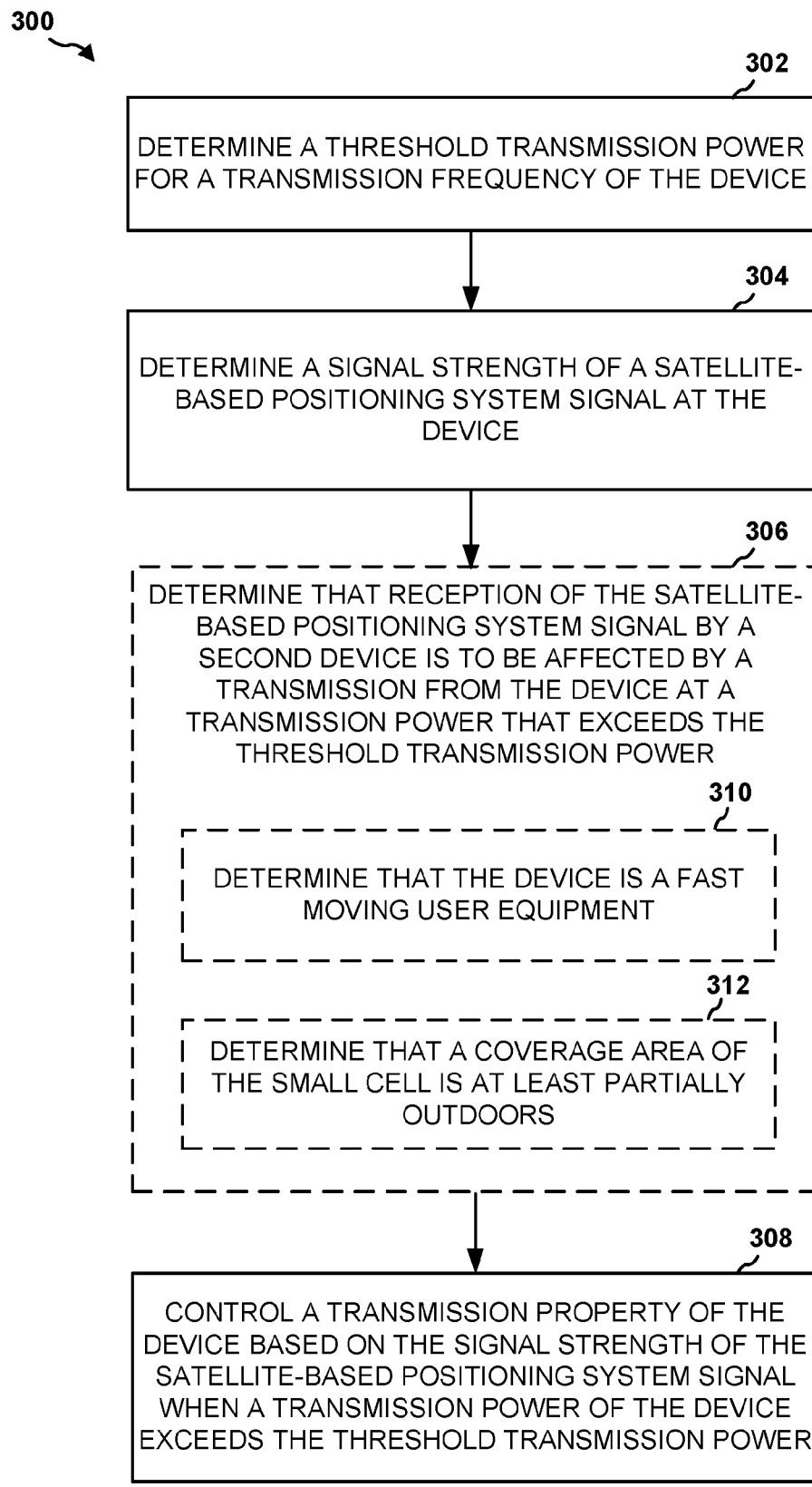
FIG. 3 is a flowchart illustrating an example of a method of mitigating interference to a satellite-based positioning system signal.

Referring to FIG. 3, in an operational aspect, a base station such as eNB 14 (FIG. 1) or a UE such as UE 12 (FIG. 1) may perform one aspect of a method 300 for mitigating interference to satellite-based positioning system signals. While, for purposes of simplicity of explanation, the method is shown and described as a series of acts, it is to be understood and appreciated that the method (and further methods related thereto) is/are not limited by the order of acts, as some acts may, in accordance with one or more aspects, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

In block 302, the method 300 may include determining a threshold transmission power for a transmission frequency of the device. In an aspect, for example, the threshold component 42 may determine a threshold transmission power for a transmission frequency of the device. The device may be either the UE 12 or the eNB 14. In an aspect, determining the threshold transmission power for the transmission frequency of the device may include determining the threshold transmission power based on a separation between the transmission frequency of the device and a frequency band used by the satellite-based positioning system signal.

In block 304, the method 300 may include determining a signal strength of a satellite-based positioning system signal at the device. In an aspect, for example, the satellite signal receiving component 44 may determine the signal strength of the satellite-based positioning system signal at the device. In an aspect, the satellite signal receiving component 44 may determine the signal strength of the satellite-based positioning system signal at the device by receiving a message including the signal strength of the satellite-based positioning system signal at the device.

In block 306, the method 300 may optionally include determining that reception of the satellite-based positioning system signal by a second device is likely to be affected by a transmission from the device at a transmission power that exceeds the threshold transmission power. In an aspect, for example, the interference estimation component 50 may determine that reception of the satellite-based positioning system signal by a second device is likely to be affected by the transmission from the device at the transmission power that exceeds the threshold transmission power. In an aspect, determining that reception of the satellite-based positioning system signal by the second device is likely to be affected by the transmission from the device may optionally include determining, at block 310, that the device is a fast moving user equipment. In another aspect, determining that reception of the satellite-based positioning system signal by the second device is to be affected by the transmission from the device may optionally include, at block 312, determining that a coverage area of the small cell includes an outdoor area.

In block 308, the method 300 may include controlling a transmission property of the device based on the signal strength of the satellite-based positioning system signal when the transmission power of the device exceeds the threshold transmission power. In an aspect, for example, the transmission control component 60 may control the transmission power of the device based on the signal strength of the satellite-based positioning system signal when the transmission power of the device satisfies the threshold transmission power. In an aspect, the transmission control component 60 may also control the transmission power of the device when reception of the satellite-based positioning system signal by the second device is likely to be affected. In an aspect, the transmission control component 60 may control the transmission power of the device when the transmission power of the device satisfies the threshold transmission power and the reception of the satellite-based positioning system signal by the second device is likely to be affected.

Figure 4:
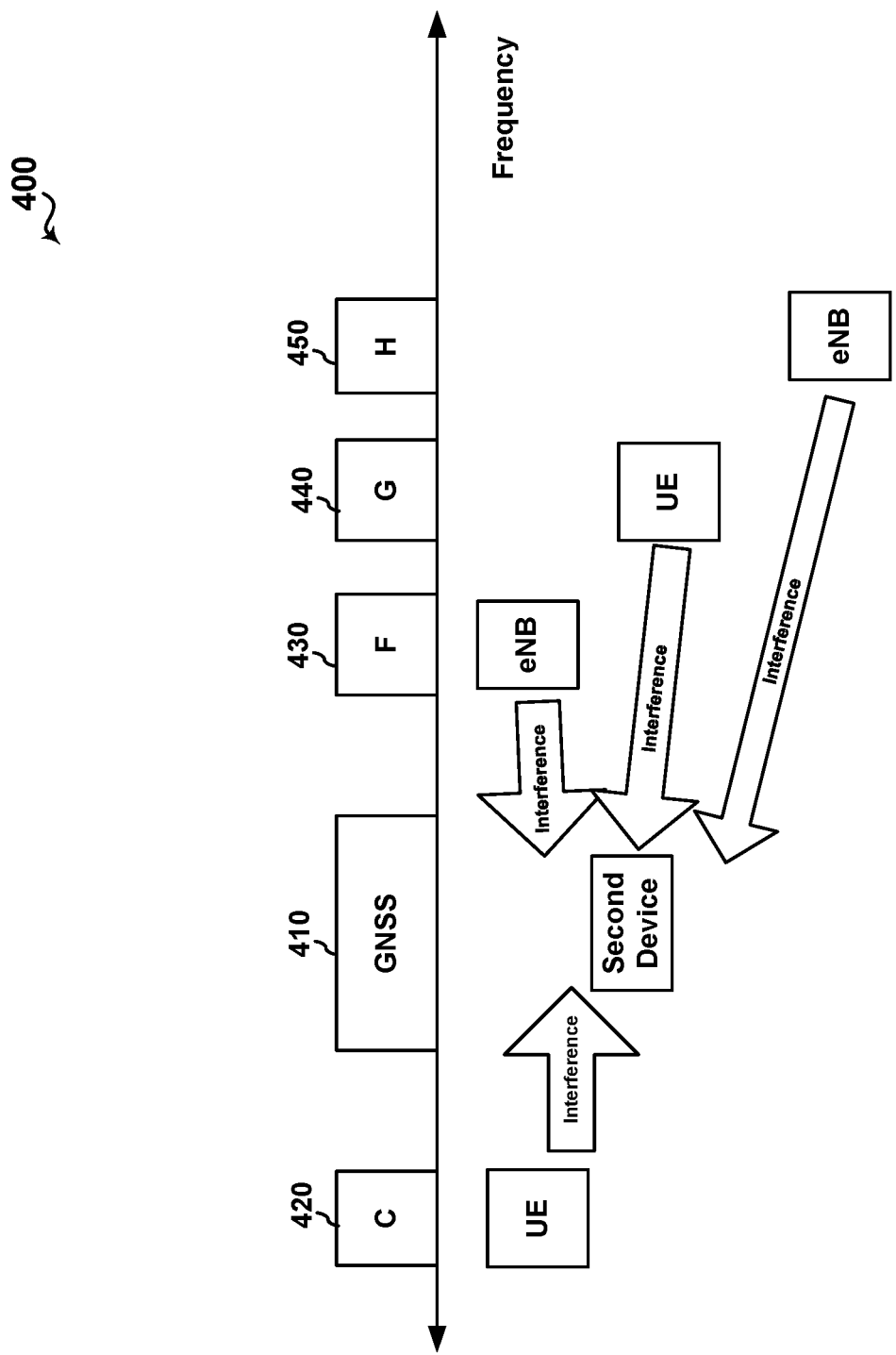
FIG. 4 is a diagram illustrating an example of frequency bands in unlicensed spectrum.

FIG. 4 shows a block diagram 400 conceptually illustrating an example of frequency bands in a portion of radio frequency spectrum. A GNSS or other satellite-based positioning system may use a frequency band 410, which may be, for example, 1559 MHz-1610 MHz. Nearby frequency bands may be used for telecommunications, for example, an LTE system or other wide area wireless network (WWAN) systems. For example, frequency band C 420, frequency band F 430, frequency band G 440, or frequency band H 450 may be used for LTE communications. In an FDD system, a frequency band may be used for transmissions in one direction. Two frequency bands may be paired for uplink and downlink transmissions. For example, frequency band H 450 may be used for downlink transmissions from eNB 14 and frequency band G 440 may be used for uplink transmissions from UE 12. In an aspect, carrier aggregation may be used to increase the bandwidth such that, for example, carriers in both frequency band F 430 and frequency band H 450 may be used for downlink transmissions to a UE 12. In an aspect, the frequency bands 420, 430, 440, or 450 may be considered unlicensed spectrum or shared spectrum. Use of such spectrum may be subject to various restrictions such as limitations on interference caused to frequency band 410. In an aspect, frequency bands in unlicensed spectrum or shared spectrum may be used for supplemental downlink carriers in addition to a primary carrier, which may use a licensed frequency band.

In an aspect, the amount of interference caused to frequency band 410 may be based, in part, on the separation between the LTE frequency band and the frequency band 410. Accordingly frequency bands 420 and 430 may more likely to cause interference to frequency band 410 than frequency bands 440 or 450. Accordingly, a transmission power threshold for frequency band 420 or 430 may be lower than a transmission power threshold for frequency bands 440 or 450.

Figure 5:
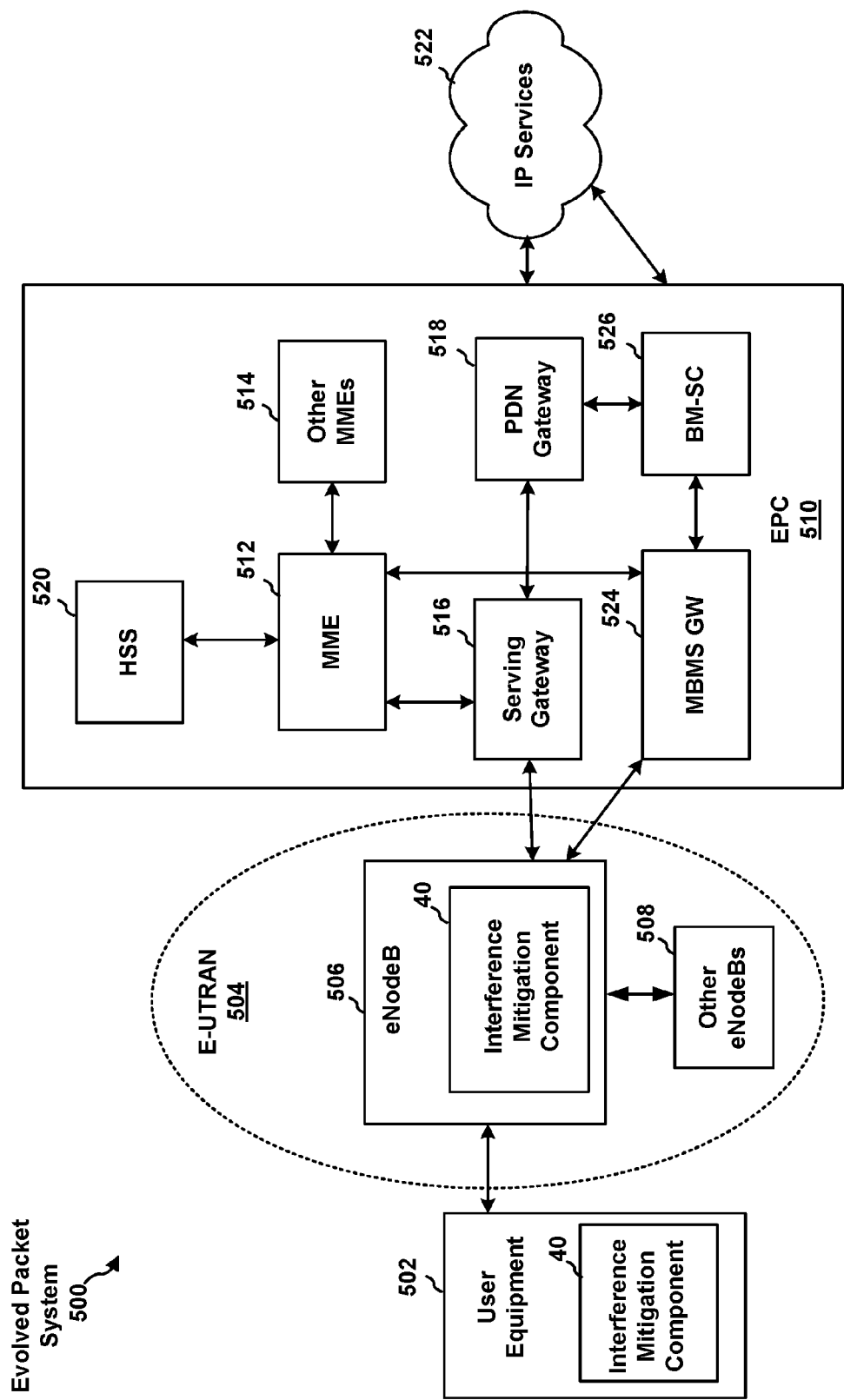
FIG. 5 is a diagram illustrating an example of a network architecture.

FIG. 5 is a diagram illustrating an LTE network architecture 500 including one or more eNBs or UEs having an interference mitigation component 40 for reducing interference to satellite-based positioning system signals. The LTE network architecture 500 may be referred to as an Evolved Packet System (EPS) 500. The EPS 500 may include one or more user equipment (UE) 502, an Evolved UMTS Terrestrial Radio Access Network (E-UTRAN) 504, an Evolved Packet Core (EPC) 510, and an Operator's Internet Protocol (IP) Services 522. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 506 and other eNBs 508, each of which may be an example of the eNB 14 or eNB 20 (FIG. 1A) and include an interference mitigation component 40. The eNB 506 provides user and control planes protocol terminations toward the UE 502. In an aspect, the interference mitigation component 40 at the eNB 506 may mitigate interference caused by the UE 502. For example, the eNB 506 may receive measurements from the UE 502 and control the transmission power of the UE 502. The eNB 506 may be connected to the other eNBs 508 via a backhaul (e.g., an X2 interface). The eNB 506 may also be referred to as a base station, a Node B, an access point, a base transceiver station, a radio base station, a radio transceiver, a transceiver function, a basic service set (BSS), an extended service set (ESS), or some other suitable terminology. The eNB 506 provides an access point to the EPC 510 for a UE 502. Examples of UEs 502 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 502 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. The UE 502 may also include an interference mitigation component 40 that may mitigate interference caused by the UE 502.

The eNB 506 is connected to the EPC 510. The EPC 510 may include a Mobility Management Entity (MME) 512, a Home Subscriber Server (HSS) 520, other MMEs 514, a Serving Gateway 516, a Multimedia Broadcast Multicast Service (MBMS) Gateway 524, a Broadcast Multicast Service Center (BM-SC) 526, and a Packet Data Network (PDN) Gateway 518. The MME 512 is the control node that processes the signaling between the UE 502 and the EPC 510. Generally, the MME 512 provides bearer and connection management. All user IP packets are transferred through the Serving Gateway 516, which itself is connected to the PDN Gateway 518. The PDN Gateway 518 provides UE IP address allocation as well as other functions. The PDN Gateway 518 and the BM-SC 526 are connected to the IP Services 522. The IP Services 522 may include the Internet, an intranet, an IP Multimedia Subsystem (IMS), a PS Streaming Service (PSS), and/or other IP services. The BM-SC 526 may provide functions for MBMS user service provisioning and delivery. The BM-SC 526 may serve as an entry point for content provider MBMS transmission, may be used to authorize and initiate MBMS Bearer Services within a PLMN, and may be used to schedule and deliver MBMS transmissions. The MBMS Gateway 524 may be used to distribute MBMS traffic to the eNBs (e.g., 506, 508) belonging to a Multicast Broadcast Single Frequency Network (MBSFN) area broadcasting a particular service, and may be responsible for session management (start/stop) and for collecting eMBMS related charging information.

Figure 6:
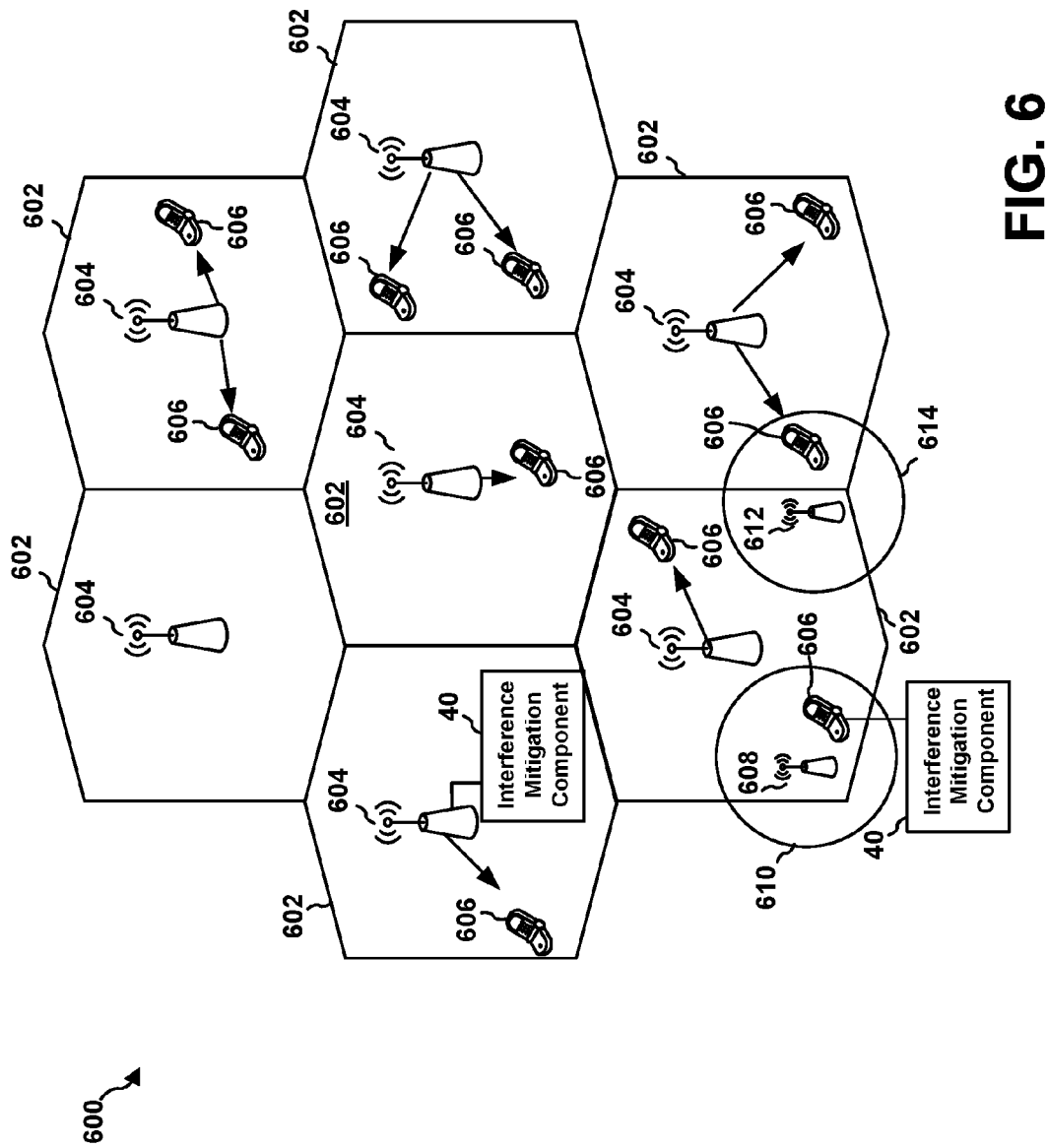
FIG. 6 is a diagram illustrating an example of an access network.

FIG. 6 is a diagram illustrating an example of an access network 600 in an LTE network architecture. In this example, the access network 600 is divided into a number of cellular regions (cells) 602. One or more lower power class eNBs 608 may have coverage areas 610 that overlap with one or more of the cells 602. The lower power class eNB 608 may be a femto cell (e.g., home eNB (HeNB)), pico cell, micro cell, or remote radio head (RRH). The macro eNBs 604 are each assigned to a respective cell 602 and are configured to provide an access point to the EPC 510 for all the UEs 606 in the cells 602. Each of the macro eNBs 604 and the lower power class eNBs 608 may be an example of the eNB 14 and include an interference mitigation component 40 for mitigating interference to satellite-based positioning system signals. In an aspect, an eNB 14 may mitigate interference by performing transmission power management (TPM), which may change the coverage area 610 of the cell. For example, the lower power class eNB 608 may reduce its transmission power and reduce the size of the coverage area 610. If a connection with a UE 606 becomes weak, the lower power class eNB 608 may handover the UE 606 to the macro eNB 604. In another aspect, when the lower power class eNB 608 reduces its transmission power, it may inform another lower power class eNB 612, which may increase its transmission power and expand its coverage area 614. There is no centralized controller in this example of an access network 600, but a centralized controller may be used in alternative configurations. The eNBs 604 are responsible for all radio related functions including radio bearer control, admission control, mobility control, scheduling, security, and connectivity to the serving gateway 516. An eNB may support one or multiple (e.g., three) cells (also referred to as sectors). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 600 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 604 may have multiple antennas supporting MIMO technology. The use of MIMO technology enables the eNBs 604 to exploit the spatial domain to support spatial multiplexing, beamforming, and transmit diversity. Spatial multiplexing may be used to transmit different streams of data simultaneously on the same frequency. The data streams may be transmitted to a single UE 606 to increase the data rate or to multiple UEs 606 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 606 with different spatial signatures, which enables each of the UE(s)

606 to recover the one or more data streams destined for that UE 606. On the UL, each UE 606 transmits a spatially precoded data stream, which enables the eNB 604 to identify the source of each spatially precoded data stream. An eNB 604 may also identify the source of ICI and cancel the interference from a combined signal received at the eNB 604.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 7:
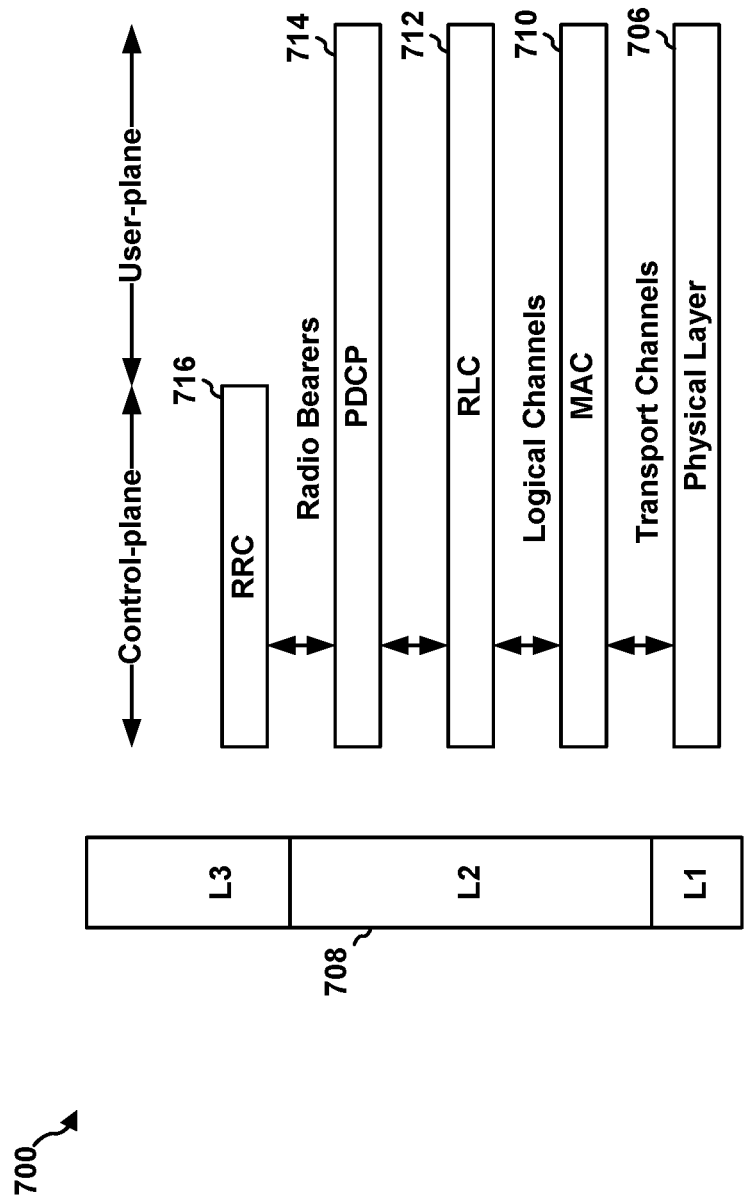
FIG. 7 is a diagram illustrating an example of a radio protocol architecture for the user and control planes.

FIG. 7 is a diagram 700 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 706. In an aspect, the interference mitigation component 40 may operate at the physical layer to measure the strength of the satellite-based positioning system signal and control the transmission power of the device. Layer 2 (L2 layer) 708 is above the physical layer 706 and is responsible for the link between the UE and eNB over the physical layer 706.

In the user plane, the L2 layer 708 includes a media access control (MAC) sublayer 710, a radio link control (RLC) sublayer 712, and a packet data convergence protocol (PDCP) 714 sublayer, which are terminated at the eNB on the network side. Although not shown, the UE may have several upper layers above the L2 layer 708 including a network layer (e.g., IP layer) that is terminated at the PDN gateway 718 on the network side, and an application layer that is terminated at the other end of the connection (e.g., far end UE, server, etc.).

The PDCP sublayer 714 provides multiplexing between different radio bearers and logical channels. The PDCP sublayer 714 also provides header compression for upper layer data packets to reduce radio transmission overhead, security by ciphering the data packets, and handover support for UEs between eNBs. The RLC sublayer 712 provides segmentation and reassembly of upper layer data packets, retransmission of lost data packets, and reordering of data packets to compensate for out-of-order reception due to hybrid automatic repeat request (HARQ). The MAC sublayer 710 provides multiplexing between logical and transport channels. The MAC sublayer 710 is also responsible for allocating the various radio resources (e.g., resource blocks) in one cell among the UEs. The MAC sublayer 710 is also responsible for HARQ operations.

In the control plane, the radio protocol architecture for the UE and eNB is substantially the same for the physical layer 706 and the L2 layer 708 with the exception that there is no header compression function for the control plane. The control plane also includes a radio resource control (RRC) sublayer 716 in Layer 3 (L3 layer). The RRC sublayer 716 is responsible for obtaining radio resources (e.g., radio bearers) and for configuring the lower layers using RRC signaling between the eNB and the UE. In an aspect where an interference mitigation component 40 at an eNB 14 mitigates interference caused by a UE 12, RRC signaling may be used to report measurements and signal thresholds or power limits.

FIG. 8 is a block diagram of an eNB 810 in communication with a UE 850 in an access network. In the DL, upper layer packets from the core network are provided to a controller/processor 875. The controller/processor 875 implements the functionality of the L2 layer. In the DL, the controller/processor 875 provides header compression, ciphering, packet segmentation and reordering, multiplexing between logical and transport channels, and radio resource allocations to the UE 850 based on various priority metrics. The controller/processor 875 is also responsible for HARQ operations, retransmission of lost packets, and signaling to the UE 850.

The transmit (TX) processor 816 implements various signal processing functions for the L1 layer (i.e., physical layer). The signal processing functions include coding and interleaving to facilitate forward error correction (FEC) at the UE 850 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 874 may be used to determine the coding and modulation scheme, as well as for spatial processing. The channel estimate may be derived from a reference signal and/or channel condition feedback transmitted by the UE 850. Each spatial stream may then be provided to a different antenna 820 via a separate transmitter 818TX. Each transmitter 818TX may modulate an RF carrier with a respective spatial stream for transmission. In an aspect, the interference mitigation component 40 may limit a transmission power of the eNB 810.

At the UE 850, each receiver 854RX receives a signal through its respective antenna 852. Each receiver 854RX recovers information modulated onto an RF carrier and provides the information to the receive (RX) processor 856. The RX processor 856 implements various signal processing functions of the L1 layer. The RX processor 856 may perform spatial processing on the information to recover any spatial streams destined for the UE 850. If multiple spatial streams are destined for the UE 850, they may be combined by the RX processor 856 into a single OFDM symbol stream. The RX processor 856 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 810. These soft decisions may be based on channel estimates computed by the channel estimator 858. The soft decisions are then decoded and deinterleaved to recover the data and control signals that were originally transmitted by the eNB 810 on the physical channel. The data and control signals are then provided to the controller/processor 859.

The controller/processor 859 implements the L2 layer. The controller/processor can be associated with a memory 860 that stores program codes and data. The memory 860 may be referred to as a computer-readable medium. In the UL, the controller/processor 859 provides demultiplexing between transport and logical channels, packet reassembly, deciphering, header decompression, control signal processing to recover upper layer packets from the core network. The upper layer packets are then provided to a data sink 862, which represents all the protocol layers above the L2 layer. Various control signals may also be provided to the data sink 862 for L3 processing. The controller/processor 859 is also responsible for error detection using an acknowledgement (ACK) and/or negative acknowledgement (NACK) protocol to support HARQ operations.

In the UL, a data source 867 is used to provide upper layer packets to the controller/processor 859. The data source 867 represents all protocol layers above the L2 layer. Similar to the functionality described in connection with the DL transmission by the eNB 810, the controller/processor 859 implements the L2 layer for the user plane and the control plane by providing header compression, ciphering, packet segmentation and reordering, and multiplexing between logical and transport channels based on radio resource allocations by the eNB 810. The interference mitigation component 40 at the UE 850 may limit a transmission power of the UE 850. In an aspect, the controller/processor 859 may prioritize logical and/or transport channels based on a restricted transmission power. The controller/processor 859 is also responsible for HARQ operations, retransmission of lost packets, and signaling to the eNB 810.

Channel estimates derived by a channel estimator 858 from a reference signal or feedback transmitted by the eNB 810 may be used by the TX processor 868 to select the appropriate coding and modulation schemes, and to facilitate spatial processing. The spatial streams generated by the TX processor 868 may be provided to different antenna 852 via separate transmitters 854TX. Each transmitter 854TX may modulate an RF carrier with a respective spatial stream for transmission.

The UL transmission is processed at the eNB 810 in a manner similar to that described in connection with the receiver function at the UE 850. Each receiver 818RX receives a signal through its respective antenna 820. Each receiver 818RX recovers information modulated onto an RF carrier and provides the information to a RX processor 870. The RX processor 870 may implement the L1 layer.

The controller/processor 875 implements the L2 layer. The controller/processor 875 can be associated with a memory 876 that stores program codes and data. The memory 876 may be referred to as a computer-readable medium. In the UL, the controller/processor 875 provides demultiplexing between transport and logical channels, packet reassembly, deciphering, header decompression, control signal processing to recover upper layer packets from the UE 850. Upper layer packets from the controller/processor 875 may be provided to the core network. The controller/processor 875 is also responsible for error detection using an ACK and/or NACK protocol to support HARQ operations.

Figure 9:
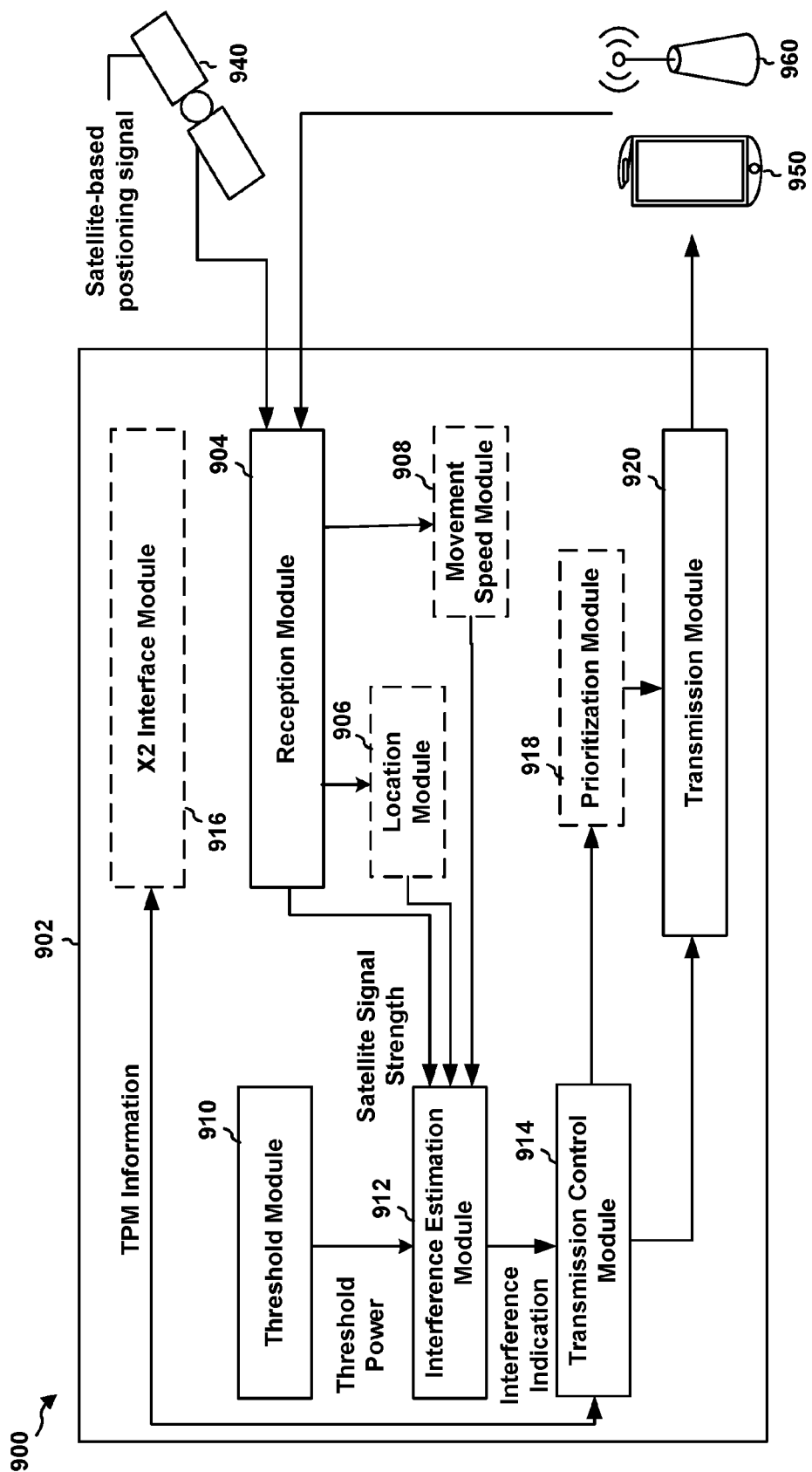
FIG. 9 is a conceptual data flow diagram illustrating the data flow between different modules/means/components in an exemplary apparatus.

FIG. 9 is a conceptual data flow diagram 900 illustrating the data flow between different modules/means/components in an exemplary apparatus 902. The apparatus 902 may be an eNB or a UE including an interference mitigation component 40.

The apparatus 902 may include a reception module 904 that receives satellite-based positioning signals from a satellite 940 and communications from a UE 950 or eNB 960. The reception module 1504 may include the satellite signal receiving component 44. For example, the reception module 904 may receive one or more satellite-based positioning signals. The reception module 904 may determine a signal strength of the satellite-based positioning signals and pass a signal strength to the interference estimation module 912. The reception module 904 may also receive signaling from the UE 950 or eNB 960. The reception module 904 may pass the satellite-based positioning signals and/or received signaling messages to the location module 906 and/or the movement speed module 908.

The interference estimation module 912 may include the interference estimation component 50 (FIG. 2). The interference estimation module 912 may receive the satellite signal strength from the reception module 904 and a threshold power from the threshold module 910. The interference estimation module 912 may also receive a location from the location module 906 and/or a movement speed from the movement speed module 908. The interference estimation module 912 may determine whether a transmission from the apparatus 902 with a transmission power exceeding the transmission threshold is likely to interfere with reception of the satellite-based positioning system signal at a nearby apparatus.

The transmission control module 914 may include the transmission control component 60 (FIG. 2). The transmission control module 914 may receive an interference indication from the interference estimation module 912. The transmission control module 914 may control the transmission power or other transmission properties of the apparatus 902 based on the interference indication and the satellite signal strength. For example, the transmission control module 914 may determine a maximum transmission power. The transmission control module 914 may pass the maximum transmission power to the X2 interface module 916, the prioritization module 918, and/or the transmission module 920.

The X2 interface module 916 may be present when apparatus 902 is an eNB. The X2 interface module 916 may communicate with other eNBs. For example, the X2 interface module 916 may communicate TPM information with other eNBs. For example, the X2 interface module 916 may indicate to the other eNBs that the apparatus 902 is reducing or increasing its transmission power. The other eNBs may adjust their transmission power accordingly. Conversely, the X2 interface module 916 may receive an indication of a change in transmission power of another eNB and send transmission power management information to the transmission control module 914.

The prioritization module 918 may receive a maximum transmission power from the transmission control module 914. The prioritization module 918 may determine whether the maximum transmission power limits the throughput of the apparatus 902. The prioritization module 918 may restrict transmissions to critical services when the maximum transmission power limits the throughput of the apparatus 902. For example, the prioritization module 918 may restrict transmissions to flows for services having a certain priority.

The transmission module 920 may receive the maximum transmission power from the transmission control module 914 and receive data for transmission from the prioritization module 918. The transmission module 920 may wirelessly send a transmission to a UE 950 or an eNB 960.

The apparatus may include additional modules that perform each of the blocks of the algorithm in the aforementioned flow charts of FIG. 3. As such, each block in the aforementioned flow chart of FIG. 3 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 10:
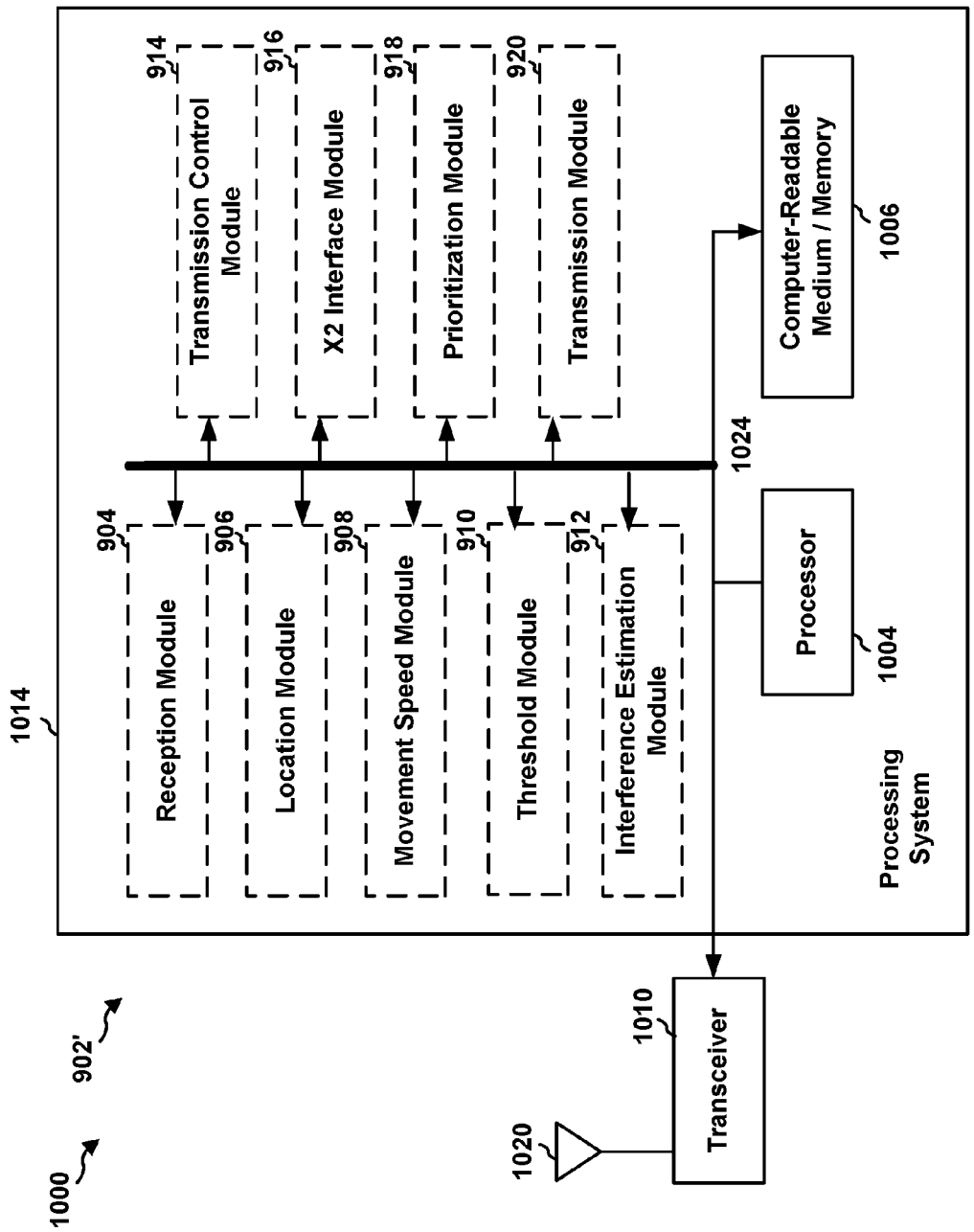
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware modules, represented by the processor 1004, the modules 904, 906, 908, 910, 912, 914, 916, 918, 920 and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception module 904. In addition, the transceiver 1010 receives information from the processing system 1014, specifically the transmission module 920, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system further includes at least one of the modules 904, 906, 908, 910, 912, 914, 916, 918, 920. The modules may be software modules running in the processor 1004, resident/stored in the computer readable medium/memory 1006, one or more hardware modules coupled to the processor 1004, or some combination thereof. The processing system 1014 may be a component of the eNB 14 or eNB 810 and may include the memory 876 and/or at least one of the TX processor 816, the RX processor 870, and the controller/processor 875. In another aspect, the processing system 1014 may be a component of the UE 12 or UE 850 and may include the memory 860 and/or at least one of the TX processor 868, the RX processor 856, and the controller/processor 859.

In one configuration, the apparatus 902 or apparatus 902' for wireless communication includes means for determining a threshold transmission power for a transmission frequency of the device. The apparatus 902/902' may further include means for determining a signal strength of a satellite-based positioning system signal at the device. The apparatus 902/902' may further include means for determining that reception of the satellite-based positioning system signal by a second device is likely to be affected by a transmission from the device at a transmission power that exceeds the threshold transmission power. The apparatus 902/902' may further include means for controlling a transmission property of the device based on the signal strength of the satellite-based positioning system signal when reception of the satellite-based positioning system signal by the second device is to be affected. The apparatus 902/902' may further include means for determining that the device is a fast moving user equipment. The apparatus 902/902' may further include means for determining that the maximum transmission power limits throughput for the device. The apparatus 902/902' may further include means for determining at least one critical service of the device. The apparatus 902/902' may further include means for restricting data for the transmission to data for the at least one critical service. The apparatus 902/902' may further include means for determining that a coverage area of the small cell includes an outdoor area. The apparatus 902/902' may further include means for performing transmission power management of the small cell based on the signal strength of the satellite-based positioning system signal. The apparatus 902/902' may further include means for reducing the coverage area of the small cell and means for expanding the coverage area of another small cell.

As described supra, the processing system 1014 may include the TX Processor 816, the RX Processor 870, and the controller/processor 875. As such, in one configuration, the aforementioned means may be the TX Processor 816, the RX Processor 870, and/or the controller/processor 875 configured to perform the functions recited by the aforementioned means. In another aspect, the processing system 1014 may include the memory 860 and/or at least one of the TX processor 868, the RX processor 856, and the controller/processor 859. As such, in one configuration, the aforementioned means may be the TX processor 868, the RX processor 856, and/or the controller/processor 859 configured to perform the functions recited by the aforementioned means.

Figure 11:
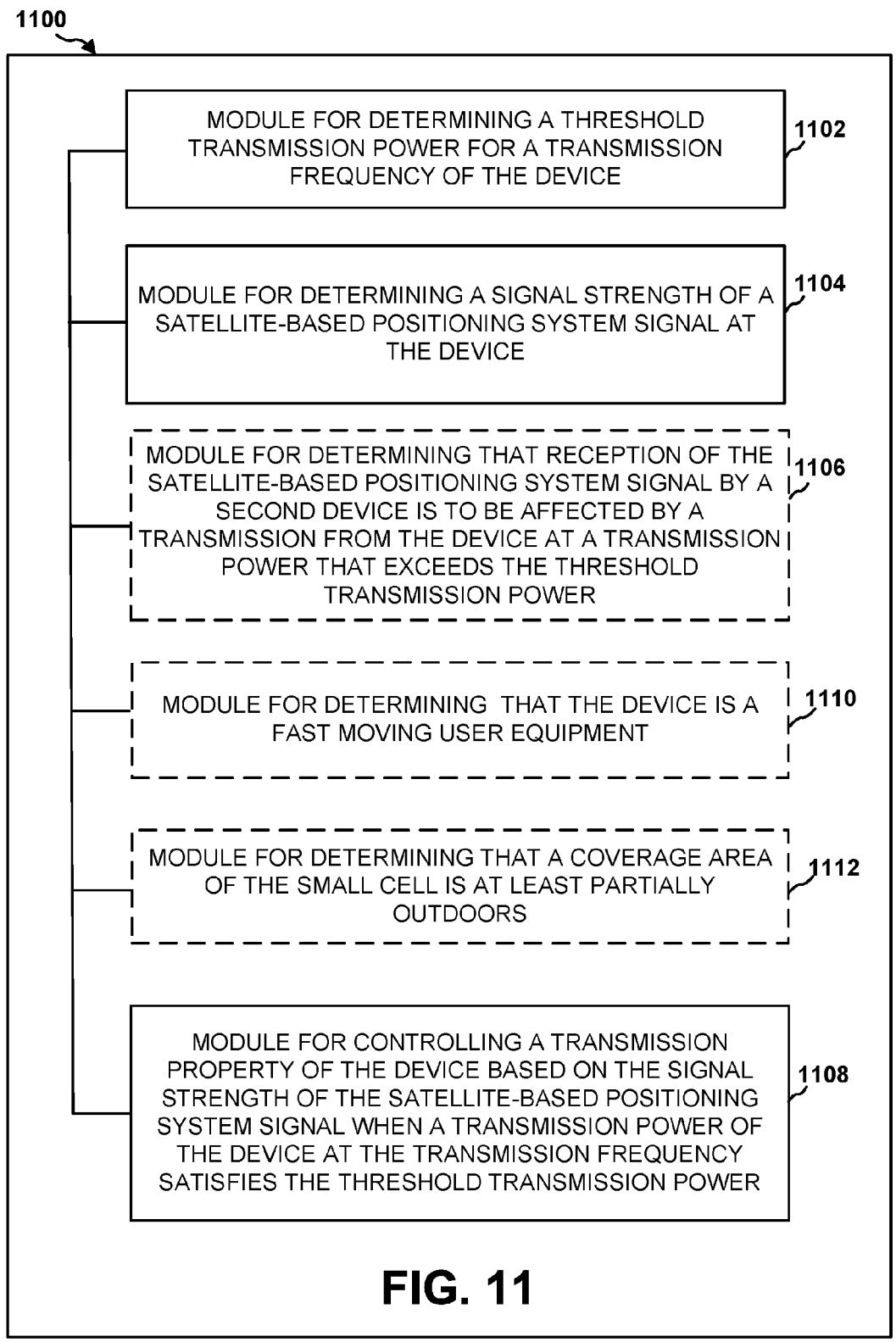
FIG. 11 a simplified block diagram of several sample aspects of apparatuses configured to support communication as taught herein.

FIG. 11 illustrates an example apparatus 1100 represented as a series of interrelated functional modules. A module 1102 for determining a threshold transmission power for a transmission frequency of a device may correspond at least in some aspects to, for example, a threshold component 42 as discussed herein. A module 1104 for determining a signal strength of a satellite-based positioning system signal at the device may correspond at least in some aspects to, for example, a satellite signal receiving component 44 as discussed herein.

A module 1106 for determining that reception of the satellite-based positioning system signal by a second device is likely to be affected by a transmission from the device at a transmission power that exceeds the threshold transmission power may correspond at least in some aspects to, for example, an interference estimation component 50 as discussed herein. In some examples, a module 1108 for controlling the transmission power of the device based on the signal strength of the satellite-based positioning system signal when reception of the satellite-based positioning system signal by the second device is to be affected may correspond at least in some aspects to, for example, an transmission control component 60 as discussed herein.

The functionality of the modules of FIG. 11 may be implemented in various ways consistent with the teachings herein. In some aspects, the functionality of these modules may be implemented as one or more electrical components. In some aspects, the functionality of these blocks may be implemented as a processing system including one or more processor components. In some aspects, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it should be appreciated that a given subset (e.g., of an integrated circuit and/or of a set of software modules) may provide at least a portion of the functionality for more than one module.

In addition, the components and functions represented by FIG. 11 as well as other components and functions described herein, may be implemented using any suitable means. Such means also may be implemented, at least in part, using corresponding structure as taught herein. For example, the components described above in conjunction with the "module for" components of FIG. 11 also may correspond to similarly designated "means for" functionality. Thus, in some aspects one or more of such means may be implemented using one or more of processor components, integrated circuits, or other suitable structure as taught herein.

It is understood that the specific order or hierarchy of blocks in the processes/flow charts disclosed is an illustration of exemplary approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of reducing interference caused by a first device, comprising:
   determining a threshold transmission power for a transmission frequency of the first device based on a first separation between the transmission frequency of the first device and a frequency band used by a satellite-based positioning system signal;
   determining a signal strength of the satellite-based positioning system signal received at the first device; and
   controlling a transmission property of the first device based on the signal strength of the satellite-based positioning system signal received at the first device when a transmission power of the first device at the transmission frequency satisfies the threshold transmission power.

2. The method of claim 1, further comprising determining that reception of the satellite-based positioning system signal by a second device is likely to be affected by a transmission from the first device at the transmission power that satisfies the threshold transmission power, wherein controlling the transmission property is further based on the determination that reception of the satellite-based positioning system signal by the second device is likely to be affected by the transmission from the first device.

3. The method of claim 2, wherein determining that reception of the satellite-based positioning system signal by the second device is likely to be affected by the transmission from the first device comprises determining that the first device is a fast moving user equipment.

4. The method of claim 1, wherein controlling the transmission property of the first device based on the signal strength of the satellite-based positioning system signal comprises setting a maximum transmission power for the first device based on the signal strength of the satellite-based positioning system signal.

5. The method of claim 4, further comprising:
   determining that the maximum transmission power limits throughput for the first device;
   determining at least one critical service of the first device; and
   restricting transmissions from the first device to transmissions for the at least one critical service.

6. The method of claim 4, further comprising:
   determining that the maximum transmission power is insufficient to maintain current data service requirements, that the maximum transmission power is insufficient to maintain an association with a current cell, or any combination thereof; and
   changing to a different cell that uses a different transmission frequency with a second separation from a frequency band used by the satellite-based positioning system signal, the second separation being greater than a first separation between the transmission frequency of the first device and the frequency band used by the satellite-based positioning system signal.

7. The method of claim 2, wherein:
the first device is a small cell, and
determining that reception of the satellite-based positioning system signal by the second device is likely to be affected by the transmission from the first device comprises determining that a coverage area of the small cell includes an outdoor area.

8. The method of claim 7, wherein determining that the coverage area of the small cell includes the outdoor area includes determining that the signal strength of the satellite-based positioning system signal received at the small cell satisfies a threshold, that a signal strength of a macro base station signal received at the small cell satisfies a threshold, or any combination thereof.

9. The method of claim 7, wherein controlling the transmission property of the first device based on the signal strength of the satellite-based positioning system signal comprises performing transmission power management of the small cell based on the signal strength of the satellite-based positioning system signal.

10. The method of claim 7, wherein controlling the transmission property of the first device based on the signal strength of the satellite-based positioning system signal comprises reducing a bandwidth centered at the transmission frequency utilized by the first device.

11. An apparatus for reducing interference caused by a first device, comprising:
a transceiver;
a memory configured to store instructions; and
a processor communicatively coupled to the transceiver and the memory, the processor configured to execute the instructions to:
determine a threshold transmission power for a transmission frequency of the first device based on a separation between the transmission frequency of the first device and a frequency band used by a satellite-based positioning system signal;
determine a signal strength of the satellite-based positioning system signal received at the first device via the transceiver; and
control a transmission property of the first device based on the signal strength of the satellite-based positioning system signal received at the first device when a transmission power of the first device at the transmission frequency satisfies the threshold transmission power.

12. The apparatus of claim 11, wherein the processor is configured to:
determine that reception of the satellite-based positioning system signal by a second device is likely to be affected by a transmission from the first device at the transmission power that satisfies the threshold transmission power; and
control the transmission property of the first device when reception of the satellite-based positioning system signal by the second device is likely to be affected.

13. The apparatus of claim 12, wherein the processor is configured to determine that reception of the satellite-based positioning system signal by the second device is likely to be affected by the transmission from the first device based on determining that the first device is a fast moving user equipment.

14. The apparatus of claim 11, wherein the processor is configured to set a maximum transmission power for the first device based on the signal strength of the satellite-based positioning system signal received at the first device.

15. The apparatus of claim 14, wherein the processor is configured to:
determine that the maximum transmission power limits throughput for the first device;
determine at least one critical service of the first device; and
restrict transmissions from the first device to transmissions for the at least one critical service.

16. The apparatus of claim 14, wherein the processor is configured to:
determine that the maximum transmission power is insufficient to maintain current data service requirements, that the maximum transmission power is insufficient to maintain an association with a current cell, or a combination thereof; and
change to a different cell that uses a different transmission frequency with a second separation from a frequency band used by the satellite-based positioning system signal, the second separation being greater than a first separation between the transmission frequency of the first device and the frequency band used by the satellite-based positioning system signal.

17. The apparatus of claim 12, wherein:
the first device is a small cell, and
the processor is configured to determine that reception of the satellite-based positioning system signal by the second device is likely to be affected by the transmission from the first device based on determining that a coverage area of the small cell includes an outdoor area.

18. The apparatus of claim 17, wherein the processor is configured to determine that the coverage area includes the outdoor area when the signal strength of the satellite-based positioning system signal received at the small cell satisfies a threshold, that a signal strength of a macro base station signal received at the small cell satisfies a threshold, or a combination thereof.

19. The apparatus of claim 17, wherein the processor is configured to perform transmission power management of the small cell based on the signal strength of the satellite-based positioning system signal.

20. The apparatus of claim 17, wherein the processor is configured to change the transmission frequency of the first device to a second transmission frequency with a greater separation from a frequency band used by the satellite-based positioning system signal than a separation between the transmission frequency of the first device and the frequency band used by the satellite-based positioning system signal.

21. An apparatus for reducing interference caused by a first device, comprising:
means for determining a threshold transmission power for a transmission frequency of the first device based on a separation between the transmission frequency of the first device and a frequency band used by a satellite-based positioning system signal;
means for determining a signal strength of a satellite-based positioning system signal at the first device; and
means for controlling a transmission property of the first device based on the signal strength of the satellite-based positioning system signal when a transmission power of the first device at the transmission frequency satisfies the threshold transmission power.

22. The apparatus of claim 21, further comprising means for determining that reception of the satellite-based positioning system signal by a second device is likely to be affected by a transmission from the first device at the transmission power that satisfies the threshold transmission power, wherein the means for controlling the transmission property is further for controlling the transmission power when reception of the satellite-based positioning system signal by the second device is likely to be affected.

23. The apparatus of claim 22, wherein the means for determining that reception of the satellite-based positioning system signal by the second device is likely to be affected by the transmission from the first device comprises means for determining that the first device is a fast moving user equipment.

24. The apparatus of claim 21, wherein the means for controlling the transmission property of the first device based on the signal strength of the satellite-based positioning system signal is further for setting a maximum transmission power for the first device based on the signal strength of the satellite-based positioning system signal.

25. The apparatus of claim 22, wherein the first device is a small cell, and wherein the means for determining that reception of the satellite-based positioning system signal by the second device is likely to be affected by the transmission from the first device comprises means for determining that a coverage area of the small cell includes an outdoor area.

26. The apparatus of claim 25, wherein the means for controlling the transmission property of the first device based on the signal strength of the satellite-based positioning system signal comprises means for performing transmission power management based on the signal strength of the satellite-based positioning system signal.

27. The apparatus of claim 26, wherein the means for performing transmission power management is further for reducing the coverage area of the small cell and for expanding a coverage area of another small cell.

28. A non-transitory computer-readable medium storing computer executable code for reducing interference caused by a first device, comprising:
  code for determining a threshold transmission power for a transmission frequency of the first device based on a separation between the transmission frequency of the first device and a frequency band used by a satellite-based positioning system signal;
  code for determining a signal strength of a satellite-based positioning system signal received at the first device; and
  code for controlling a transmission property of the first device based on the signal strength of the satellite-based positioning system signal received at the first device when a transmission power of the first device at the transmission frequency satisfies the threshold transmission power.

* * * * *